(12) United States Patent
Baron, Sr. et al.

(10) Patent No.: US 6,683,609 B1
(45) Date of Patent: Jan. 27, 2004

(54) REAL-TIME THREE-DIMENSIONAL WEATHER DATA PROCESSING METHOD AND SYSTEM

(75) Inventors: Robert O. Baron, Sr., Huntsville, AL (US); Gregory S. Wilson, Huntsville, AL (US); Ronald J. Phillips, Madison, AL (US); Tom S. Thompson, Athens, AL (US); Brian Patrick Davis, Huntsville, AL (US)

(73) Assignee: Baron Services, Inc., Huntsville, AL (US)

( * ) Notice: Subject to any disclaimer, the term of this patent is extended or adjusted under 35 U.S.C. 154(b) by 0 days.

(21) Appl. No.: 10/123,632

(22) Filed: Apr. 16, 2002

Related U.S. Application Data (63) Continuation of application No. 09/782,484, filed on Feb. 13, 2001, now Pat. No. 6,384,830, which is a continuation of application No. 09/174,213, filed on Oct. 16, 1998, now Pat. No. 6,266,063.
(60) Provisional application No. 60/062,588, filed on Oct. 20, 1997.

(51) Int. Cl.$^7$ .............................................. G06T 15/00
(52) U.S. Cl. ..................................................... 345/419
(58) Field of Search ................................ 345/419, 420, 345/619, 629; 342/357.13, 357.06; 702/3

(56) References Cited

U.S. PATENT DOCUMENTS

| | | | |
|---|---|---|---|
| 4,873,481 A | 10/1989 | Nelson et al. | 324/999 |
| 5,053,778 A | 10/1991 | Imhoff | 342/191 |
| 5,135,397 A | 8/1992 | Yen | 434/2 |
| 5,239,623 A | 8/1993 | Sato et al. | 395/119 |
| 5,255,190 A | 10/1993 | Sznaider | 364/420 |
| 5,262,773 A | 11/1993 | Gordon | 340/968 |
| 5,262,782 A | 11/1993 | Rubin et al. | 342/26 |
| 5,281,815 A | 1/1994 | Even-Tov | 250/339 |
| 5,317,689 A | 5/1994 | Nack et al. | 395/163 |
| 5,339,085 A | 8/1994 | Katoh et al. | 343/180 |
| 5,351,045 A | 9/1994 | Cornman | 340/968 |
| 5,363,475 A | 11/1994 | Baker et al. | 395/122 |
| 5,379,215 A | 1/1995 | Kruhoeffer et al. | 364/420 |
| 5,523,759 A | 6/1996 | Gillberg et al. | 342/26 |
| 5,583,972 A | 12/1996 | Miller | 395/119 |
| 5,598,359 A | 1/1997 | Montag et al. | 364/578 |
| 5,630,718 A | 5/1997 | Montag et al. | 434/2 |
| 5,648,782 A | 7/1997 | Albo et al. | 342/26 |
| 5,717,589 A | 2/1998 | Thompson et al. | 364/420 |
| 5,805,156 A | 9/1998 | Richmond et al. | 345/328 |
| 5,839,089 A | 11/1998 | Yasuda et al. | 702/3 |

(List continued on next page.)

OTHER PUBLICATIONS

US 5,867,805, 2/1999, Brown (withdrawn)
Crum, Timothy D.; Alberty, Ron L., "The WSR–88D and the WSR–88D Operational Support Facility," *Bulletin of the American Meteorological Society*, Sep. 1993, pp. 1669–1687, vol. 74, No. 9, American Meterological Society, Norman, OK.

(List continued on next page.)

*Primary Examiner*—Phu K. Nguyen
(74) *Attorney, Agent, or Firm*—Lanier Ford Shaver & Payne P.C.

(57) ABSTRACT

A method of processing meteorological data to combine meteorological threat products for presentation in a single graphical image is disclosed. In accordance with the invention, meteorological data is received from at least one meteorological data source, and the received meteorological data is processed to generate more than one distinct threat products for a given geographic area. The distinct threat products are then combined to create a composite threat product, which may be graphically displayed together with a graphical representation of the geographic area affected by the threat products. A system for processing meteorological data for the graphical display of more than one threat product in a single graphical image is also disclosed.

16 Claims, 10 Drawing Sheets

U.S. PATENT DOCUMENTS

| | | | |
|---|---|---|---|
| 5,850,619 A * | 12/1998 | Rasmussen et al. | 702/3 |
| 5,910,763 A | 6/1999 | Flanagan | 340/286 |
| 5,940,776 A | 8/1999 | Baron et al. | 702/4 |
| 5,943,629 A | 8/1999 | Ballard et al. | 702/2 |
| 5,945,926 A | 8/1999 | Ammar et al. | 340/970 |
| 5,959,567 A | 9/1999 | Wolfson et al. | 702/3 |
| 5,974,360 A | 10/1999 | Otsuka et al. | 702/3 |
| 5,978,738 A | 11/1999 | Brown | 702/3 |
| 6,018,699 A * | 1/2000 | Baron et al. | 702/3 |
| 6,035,710 A | 3/2000 | Hutchison et al. | 73/170 |
| 6,043,756 A | 3/2000 | Bateman et al. | 340/945 |
| 6,052,648 A | 4/2000 | Burfeind et al. | 702/3 |
| 6,076,044 A | 6/2000 | Brown | 702/3 |
| 6,081,220 A | 6/2000 | Fujisaka et al. | 342/26 |
| 6,100,897 A | 8/2000 | Mayer et al. | 345/428 |
| 6,104,582 A | 8/2000 | Cannon et al. | 361/1 |
| 6,112,074 A | 8/2000 | Pinder | 455/404 |
| 6,112,075 A | 8/2000 | Weiser | 455/404 |
| 6,125,328 A | 9/2000 | Baron et al. | 702/3 |
| 6,163,756 A | 12/2000 | Baron et al. | 702/3 |
| 6,266,063 B1 * | 7/2001 | Baron et al. | 345/419 |
| 6,339,747 B1 | 1/2002 | Daly et al. | 702/3 |
| 6,340,946 B1 | 1/2002 | Wolfson et al. | 342/26 |
| 6,356,843 B1 * | 3/2002 | Baron et al. | 702/3 |
| 6,384,830 B2 * | 5/2002 | Baron et al. | 345/473 |
| 6,401,039 B1 * | 6/2002 | Baron et al. | 702/3 |

OTHER PUBLICATIONS

"Operations Training Branch, Build 9.0 Precursor Training," (USA) Jul. 15, 1996, National Oceanic and Atmospheric Administration.

Unisys WeatherMAX Resource Page, http://weather.unisys.com/wxmax/index.html Oct. 2002.

Blacker, R.H., Jr.; Duda, R.O., "Application of Pattern Recognition Techniques to Digitized Radar Data," 1972, pp. 138–143, Stanford Research Institute, Menlo Park, California.

Bjerkaas, Carlton L.; Forsyth, Douglas E. "An Automated Real–Time Storm Analysis and Storm Tracking Program (WEATRK)," *AFGL–TR–80–0316*, Oct. 1, 1980, pp. 1–115, Air Force Geophysics Laboratory, Hanscom AFB, Massachusetts.

Zittel, W. David, "An Aviation Composite Hazards Product," 2$^{nd}$ International Conference on The Aviation Weather System, Jun. 19–21, 1985, pp. 109–116, American Meterological Society, Montreal, Canada.

Forsyth, Douglas E.; Istok, Michael J.; O'Bannon, Timothy D.; Glover, Kenneth M., "Boston Area Nexrad Demonstration (BAND)," *AFG:–TR–85–0098*, May 8, 1995, pp. 1–59, Air Force Geophysics Laboratory, Hanscom AFB, Massachusetts.

Zittel, W. David, "Computer Application and Techniques for Storm Tracking and Warning," 17$^{th}$ *Conference on Radar Meterology*, Seattle, WA, Oct. 26–29, pp. 514–521, 1976, American Meterological Society, Boston, Massachusetts.

Ostlund, Stllan Sven, "Computer Software for Rainfall Analyses and Echo Tracking of Digitized Radar Data," *NOAA Technical Memorandum ERL WMPO–15*, May 24, 1974, pp. 1–82, National Oceanic and Atmospheric Administration, Boulder, Colorado.

Wiggert, Victor; Ostlund, Stellan S.; Lockett, Gloria J.; Stewart, John V., "Computer software for the Assessment of Growth Histories of Weather Radar Echoes," 1976, pp. 1–86, National Hurricane and Experimental Meterology Laboratory, Coral Gables, Florida.

Zittel, W. David, "Evaluation of a Remote Weather Radar Display—vol. 11—Computer Application for Storm Tracking and Warning," *FAA–RD–75–60, II*, Dec. 1976, pp. 1–112, National Oceanic and Atmospheric Administration, Springfield, Virginia.

Wieler, James G.; Harris, F. Ian; Snapp, Michael R., "An Evaluation of an Automatic Cell Detection and Tracking Algorithm." *AFGL–TR–82–0368*, Nov. 30, 1982, pp. 1–50, National Oceanic and Atmospheric Administration, Air Force Geophysics Laboratory, Hanscom AFB, Massachusetts.

Blackmer, Roy H., Jr., "The Lifetime of Small Precipitation Echos," 1953, pp. 103–108, Massachusetts Institute of Technology.

The NEXRAD Joint System Program Office, "NEXRAD Technical Requirements [WSR–88D]," *R400–SP401A*, Nov. 1, 1991, pp. 3–1–M–2, NEXRAD Joint System Program Office, Silver Spring, Maryland.

The NEXRAD Joint System Program Office, "Next Generation Weather Radar Product Description Document," *R400–PD–202*, Dec., 1986, NEXRAD Joint System Program Office, Silver Spring, Maryland.

Wilk, Kenneth E.; Gray, Kathryn C., "Processing and Analysis Techniques Used with the NSSL Weather Radar System," 1970, pp. 369–374, National Severe Storms Laboratory, Norman, Oklahoma.

Forstyh, Douglas Edward, "Real Time Forecasting of ECO-H–Centroid Motion—A Thesis Submitted to the Graduate Faculty, The University of Oklahoma Graduate College," 1979, University of Oklahoma.

The NEXRAD Joint System Program Office, "Next Generation Weather Radar: Results of Spring 1983 Demonstration of Prototype NEXRAD Products in an Operational Environment." Sep., 1984, NEXRAD Joint System Program Office, Silver Spring, Maryland.

Barclay, Peter A.; Wilk, Kenneth E., "Severe Thunderstorm Radar Echo Motion and Related Weather Events Hazaradous to Aviation Operations," *ESSA Technical Memorandum ERLTM–NSSL 46*, Jul., 1970, National Severe Storms Laboratory, Norman, Oklahoma.

Eilts, Michael D.; Johnson, J.T.; Mitchell, E. Dewayne; Sanger, Sarah; Stumpf, Greg; Witt, Arthur; Thomas, Kevin W.; Hondl, Kurt D.; Rhue, Douglas; Jain, Michael. "Severe Weather Warning Decision Support System," *Bulletin of the American Meterological Society*, Feb., 1996, pp. 536–540, American Meterological Society.

Stumpf, Gregory J.; Foster, Michael P., "1995 NSSL Warning Decision Support System Test," *Bulletin of the American Meterological Society*, Feb., 1996, pp. 570–574, American Meterological Society.

Dixon, Michael; Wiener, Gerry., "Titan: Thunderstorm Identification, Tracking, Analysis and Nowcasting—A Radar-based Methodology," *Journal of Atmospheric and Oceanic Technology*, Dec. 1993, pp. 785–797, vol. 10, No. 6, American Meterological Society.

Forsyth, Douglas, E.; Burgess, Donald W.; DoswellIII, Charles A.; Jain, Michael H.; Mooney, Larry E.; Rabin, Robert M.; Rust, David W., "NOAA Technical Memorandum ERL NSSL–101: Doplight '87 Project Summary," Jun., 1990, pp. 1–183, NOAA, Norman, OK.

Rinehart, R.E., "Radar for Meterologists." http://people.aero.und.edu/~rinehart/toc.html, 1991.

* cited by examiner

REAL-TIME THREE-DIMENSIONAL WEATHER DATA PROCESSING METHOD AND SYSTEM

CROSS-REFERENCE TO RELATED APPLICATIONS

This application is a continuation-in-part of U.S. patent application Ser. No. 09/782,484 filed on Feb. 13, 2001, now U.S. Pat. No. 6,384,830, which is a continuation of U.S. patent application Ser. No. 09/174,213 filed on Oct. 16, 1998, now U.S. Pat. No. 6,266,063, which claims the benefit of U.S. Provisional Patent Application Serial No. 60/062,588 filed on Oct. 20, 1997, the disclosures of which are hereby incorporated by reference herein.

BACKGROUND

1. Field of the Invention

This invention relates generally to weather broadcasting and display systems, and more particularly to a system and method for displaying multiple meteorological threats in a single threat image.

While the threat image of the present invention may be displayed in a variety of formats, it is particularly well suited for three-dimensional weather display utilizing real-time three-dimensional representations of meteorological data including radar gathered data combined with geographical data for television broadcasts of simulated weather patterns in three dimensions.

2. Technical Background

For many years people have relied on weather broadcasts to help plan their lives. According to Robert Henson in his book, *Television Weathercasting: A History*, weather "consistently ranks as the top draw in both local and national news (when featured in the latter)." According to a poll conducted by the National Oceanic and Atmospheric Administration in 1980, weather was "the major reason that people watch the news programs."

The field of meteorology has seen significant technological advances in the past few years. New and innovative devices such as Doppler radar, thunderstorm detectors, and wind and temperature profilers have all helped meteorologists better understand and predict weather.

However, despite public interest and technological advances, the weather display seen by television viewers has not changed significantly over the years. In nearly all television broadcasts, weather data is presented as a flat, 2-D (two-dimensional) map overlay. In the mid 1970's, "color-radar" was introduced, which differentiates areas of precipitation using a color-coding scheme. Patches of heavy rain, snow or hail are all depicted the same way: in red. Lighter areas of precipitation are represented in varying shades of yellow, green or blue.

The typical current weathercast display represents the weather symbolically rather than realistically and usually only shows the general air temperature and the location of precipitation. In some instances, a superimposed satellite display of fluffy cloud patterns is shown moving along over the flat map from an exaggerated height observation point. The "blue screen" display behind the announcer still usually shows the familiar two-dimensional patchwork rainfall amounts in red, yellow, green and blue. The satellite imagery displayed on the evening broadcast may be anywhere from a half-hour to four ours old.

Also significant is the information that is absent from the conventional weathercast display, such as: (1) the type of precipitation, (2) the strength and location of wind shear, (3) the presence of tornadic signatures showing rapid circular motion, (4) the location of updraft vault, (5) the location of wall clouds, (6) the location of heavy lightning activity, and (7) the wind direction on the ground.

The National Weather Service has a network of advanced S-Band radar stations in place at 138 sites in the United States, and is capable of delivering 77 different products to government meteorologists. These products include; winds aloft, lightning activity and wind shear conditions, such as microburst activity. However, of these 77 products, only 11 are commercially available through contract with several private weather service companies which act as intermediaries between the National Weather Service and the public. These companies charge for the use of these eleven products and, in order to receive the latest radar (NEXRAD) information from a particular site, a private individual or company pays a monthly fee to receive the radar signal.

There are several patents, which disclose various systems of three-dimensional representation of topographical data and meteorological data for pilots and flight simulators used in pilot training.

Manelphe, U.S. Pat. No. 5,077,609 discloses an optoelectric system of assistance in attack and navigational missions, which provides a three-dimensional localization of a point of interest for a navigational resetting operation or for a firing control operation.

Yen, U.S. Pat. No. 5,135,397 discloses a 3-D weather simulation system used with a four-channel digital radar landmass simulator (DRLMS) for flight simulators, which integrates culture, elevation, aspect, and weather. Weather maps can be loaded into the system as weather patterns and can be expanded, rotated, and translated. Weather mass is simulated in three dimensions, i.e., having a bottom and height. Implementation entails the full or partial occultation of terrain and targets by weather, and vice versa.

U.S. Pat. No. 5,583,972 issued to Miller describes a weathercasting system for displaying weather radar information in 3D, such that the viewer can simulate moving through the system to visualize the effects of a weather system at various geographical locations. Miller allows for the combination of data from multiple weather sources, but states that his weather images will be at least 20 minutes old by the time they are broadcast. This time delay is due in large part to the variety of weather data sources utilized by Miller, which cause delays both in receiving and assimilating the information.

The present invention is distinguished over the prior art in general, and these patents in particular by providing a weather-casting system for displaying dynamic real time three-dimensional pictorial representations of weather conditions created from meteorological data combined with geographical data. Meteorological data including precipitation, cloud cover data, the bottom and top of cloud formations, and reflectivity and velocity of rain droplets in real-time are acquired from C-band Doppler radar, which is combined with NEXRAD data, and the data is digitized and processed to produce a simulated, graphically displayable three-dimensional image of the meteorological data. The meteorological data is combined with the geographical data and displayed on a computer display screen, and manipulated by peripheral devices connected with the computer. The combined data is displayed as a three-dimensional graphical representation of weather conditions relative to a selective geographical area. The graphical representation can be manipulated to allow the viewer to visualize the effects of the weather system at various geographical locations, and from various angles. The graphical representation will also provide full volumetric data of the storm, allowing the user to "slice" the storm to view cross sections from various angles, and from various positions, including viewing the storm and a cross section from within the storm itself.

One problem associated with combining NEXRAD data with real-time Doppler radar data is the time delay. NEXRAD data is typically updated only once every five or six minutes, whereas TV station Doppler radar data is practically instantaneous. If the user is to present a full 3D volumetric model of a storm system, then the model would need to be at least six minutes old to make use of the NEXRAD data. However, the present invention provides means for utilizing all of the NEXRAD data, as it is available to match the real-time Doppler radar data. The NEXRAD data combined with the real-time Doppler radar provides an approximation of the entire volumetric data of the storm in real time.

Another shortcoming associated with the graphical weather display systems known in the art relates to the manner in which severe weather data is presently displayed to a viewer. Severe weather poses at least three major threats to viewers—heavy rains, hail, and dangerous winds. To present all three such threats to viewers, meteorologists or other users typically interpret three separate sets of data and produce three separate images, then update the data and corresponding images every few minutes. This is a difficult and time-consuming task, given the time demands placed upon meteorologists during the occurrence of a severe weather event.

In essence, meteorologists have to juggle being both an interpreter and a presenter of data. With multiple weather events to show and multiple displays required to show them, the meteorologist has little time to prepare a presentation and almost no time for actual interpretation. As a result, even the best meteorologist often provides less than accurate information regarding the location and intensity of severe weather events and their anticipated paths of travel.

What is needed, therefore, is a system and method of processing weather data that facilitates the expedient examination of the above-mentioned three major threats at one time. More specifically, there is a need for a computer based system and method for processing radar return data to create a composite threat product which contains meteorological data pertaining to each of the three major threats (heavy rains, hail, and dangerous winds) affecting a geographic region at a particular time. The composite threat product should be capable of being graphically displayed on a display device as a composite threat image. The system should further automatically associate the composite threat product, and thus the composite threat image with geographic data indicative of the geographic area affected by each of the threats represented by the composite threat product or image. Such a system and method will enable a meteorologist to accurately interpret the received meteorological data and provide viewers with a more accurate report on the present and anticipated location of heavy rains, hail, and dangerous winds affecting that geographic region. It is to the provision of such a system and method that the present invention is primarily directed.

SUMMARY

It is therefore an object of the present invention to provide a 3-D weather display system utilizing real-time, three-dimensional representations of combined meteorological data including Doppler radar data and NEXRAD data for television broadcasts of simulated weather patterns.

It is another object of this invention to provide a 3D weather display system, wherein NEXRAD data is extrapolated forward in time for combination with real-time Doppler radar data. The combined data is then used to provide an approximation of real-time weather data in full volumetric 3D display.

One aspect of the present invention relates to a method of processing weather data. The method includes the steps of receiving weather data, processing the received weather data to generate, threat images, distinct from one another, for a given geographic area, and combining the threat images to create a composite threat image.

An additional aspect of the present invention is directed to a method of processing meteorological data. The method includes the steps of creating a composite threat product from meteorological data received from a meteorological data source and associating the composite threat product with geographic data indicative of the geographic area affected by the composite threat product.

In another aspect, the present invention is directed to a system for processing meteorological data. The system includes memory for storing received meteorological data, and a processor communicating with the memory to create distinct threat products from the received meteorological data. The processor is instructed to combine the distinct threat products to produce a composite threat product capable of being graphically displayed.

In yet another aspect, the present invention relates to a method of processing meteorological data. The method includes the steps of receiving meteorological data indicative of a meteorological event affecting a geographic region, and processing the received meteorological data to create threat products, distinct from one another, affecting the geographic region. The distinct threat products affecting the geographic region are combined to create a composite threat product.

This system and method of processing meteorological data of the present invention provides a number of advantages over other systems and methods currently known in the art. For example, a system and method the present invention enables at least two or more severe weather threats to be displayed together on a display device at the same time. As a result, meteorologists or other users can quickly and efficiently interpret and disseminate information relating to the severe weather threats to viewers. Moreover, because the threats can now be displayed together, severe weather updates and forecasts are now more accurate and may be provided to viewers on a more timely basis. In addition, severe weather updates may now be more specific with respect to intensity and location of each of the severe weather threats.

These and additional features and advantages of the invention will be set forth in the detailed description which follows and in part will be readily apparent to those skilled in the art from that description or recognized by practicing the invention as described herein.

It is to be understood that both the foregoing general description and the following detailed description are merely exemplary of the invention and are intended to provide an overview or framework for understanding the nature and character of the invention as it is claimed. The accompanying drawings are included to provide further understanding of the invention, illustrate various embodiments of the invention, and together with the description, serve to explain the principles and operations of the invention.

DETAILED DESCRIPTION

Figure 1:
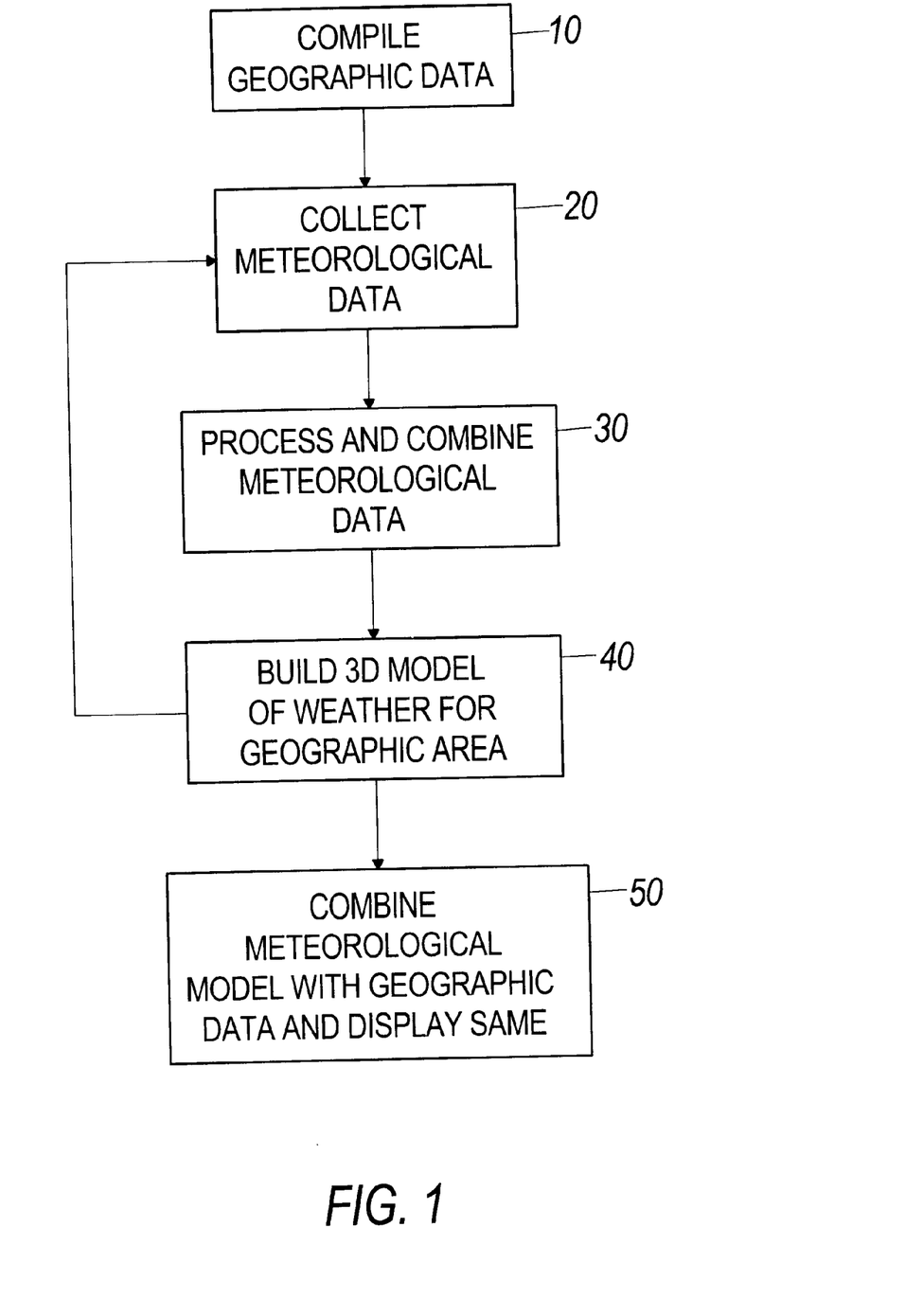
FIG. 1 is a block diagram illustrating the basic stages of the present invention for collecting, processing, and displaying weather data.
Figure 2:
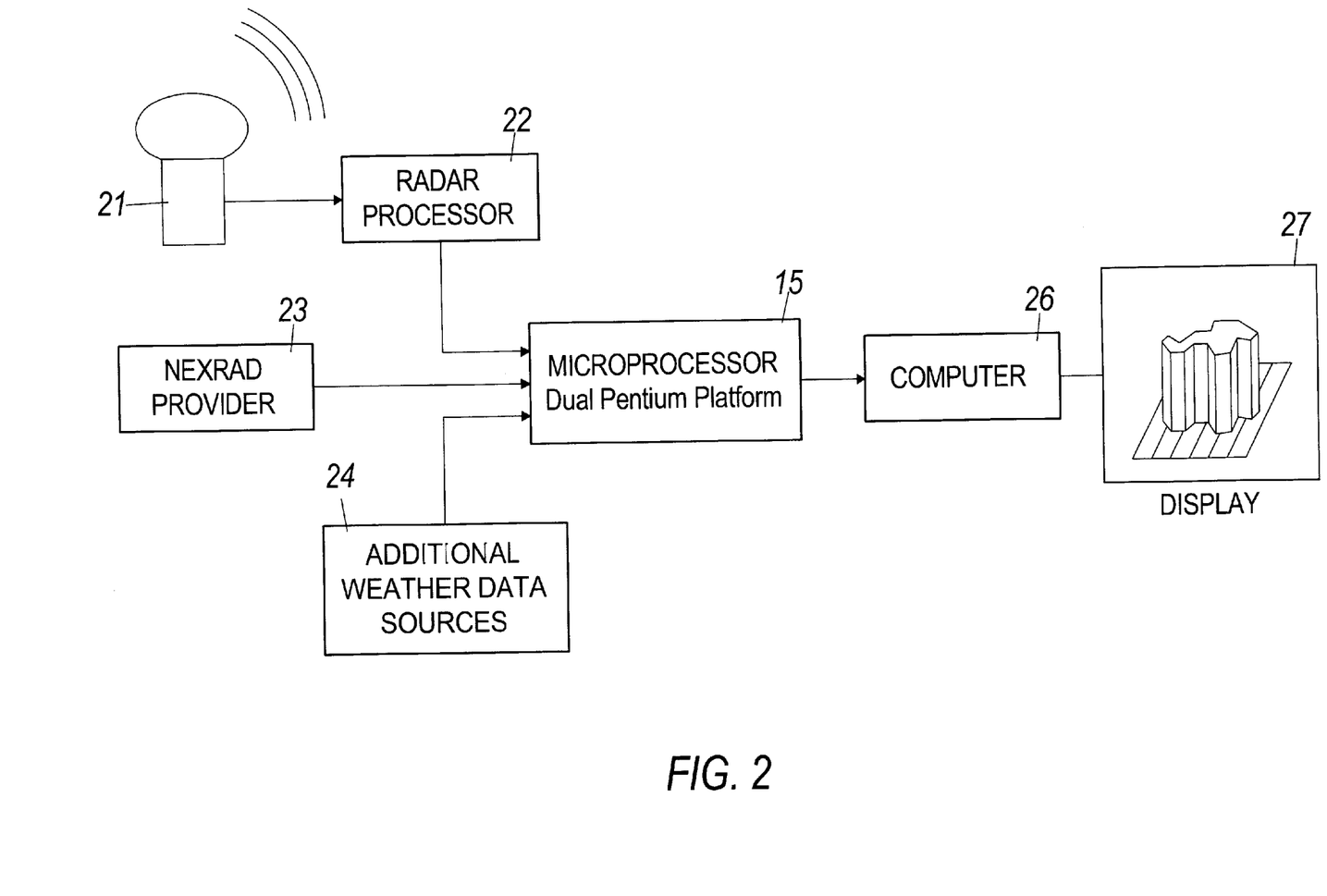
FIG. 2 is a schematic of the major components of the preferred system of the present invention.
Figure 3:
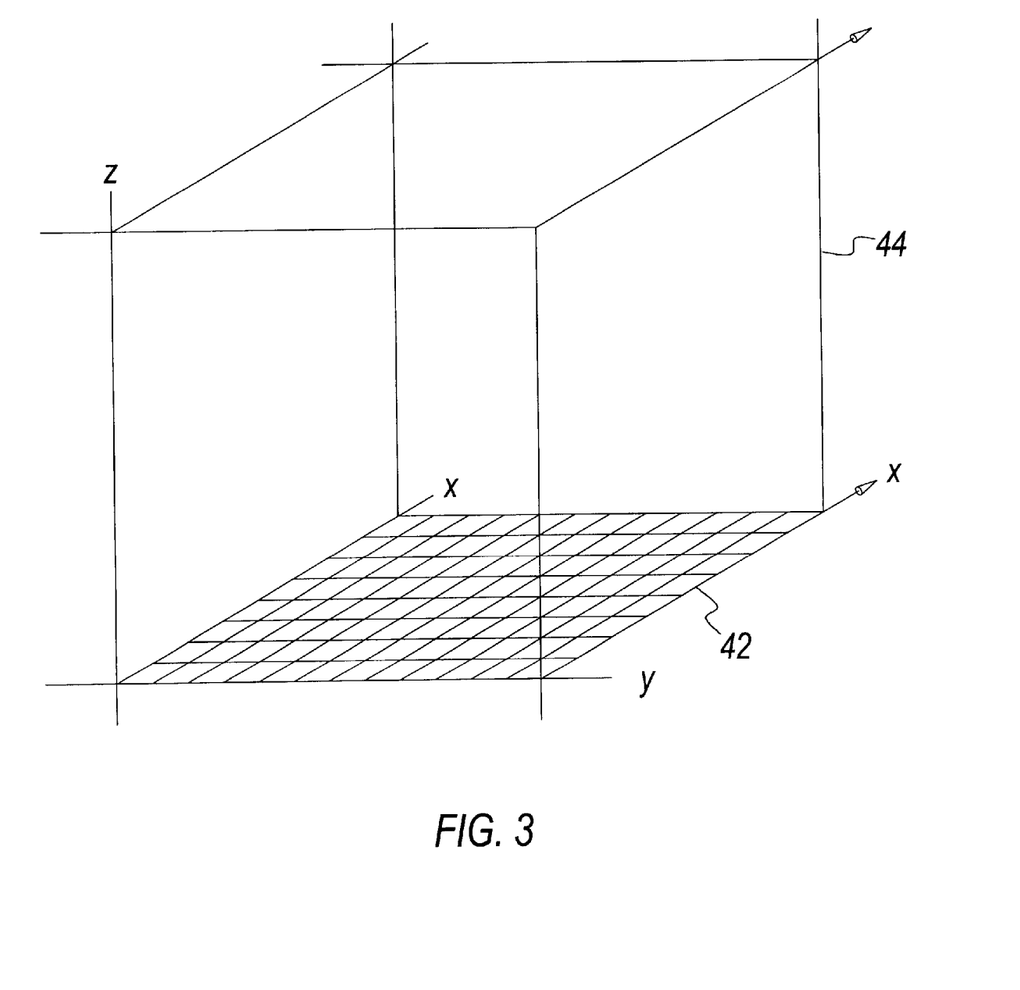
FIG. 3 is an illustration of a typical three-dimensional area that is the subject of the present invention.

Referring to the drawings by reference numerals, there is shown in FIG. 1 an exemplary block diagram illustrating, the basic stages of obtaining and processing weather data in accordance with one embodiment. FIG. 2 illustrates one embodiment of the major components of a system of the present invention, and FIG. 3 illustrates schematically an exemplary fusing of the NEXRAD data with real-time Doppler radar data.

The present system incorporates five functional stages for obtaining and processing the weather data; (1) create and store geographical data 10. (2) acquire meteorological data 20. (3) process and combine the meteorological data 30, (4) create 3-D graphical representation of weather display 40, and (5) combine weather display with geographic data 50.

Referring to FIG. 2, the major components utilized in the system are shown. In the first stage 10 (FIG. 1), microprocessor 15 may compile and store geographical data of a pre-determined geographical area in memory. The geographical data is accessed and retrieved as needed while the system is in use. In one embodiment, a detailed map of the selected area, which includes information, such as, by way of example, state and county boundary information, landmarks, waterways, and even detailed street maps of the entire area, is stored. This permits a viewer to quickly recognize the geographic area, and enables the system to provide a "zoom-in" feature that displays information down to street level.

In the second stage 20 (FIG. 1), meteorological data is obtained in real-time using Doppler radar units 21 operated from at least one location and in conjunction with NEXRAD data 23. Ancillary meteorological data 24, such as, by way of example, cloud height, temperature, humidity, dew point, total rainfall, and satellite imagery, may be obtained by non-radar measurements.

In one embodiment, Doppler radar units 21 are C-band or X-band Doppler meteorological surveillance radar with automatic computer processing systems 22 and ground clutter suppression. These radar units 21 provide measurement of both reflectivity and velocity of rain droplets and can scan volumetrically to produce high-quality images. In a reflectivity mode, the rain droplet echoes are scaled to correspond directly to values of rainfall intensity or rainwater content. In velocity mode, the radar measures the movement of scattering particles along the radar beam. In addition, special lightning detection software and algorithms may be incorporated with the C-band radar to forecast lightning hazards. Radar automatic computer processing system 22 provides radar control, user interface and real-time display tasks. Base parameters, such as mean velocity, reflectivity and spectral width, can be automatically displayed and archived on disk. Radar computer processing system 22 also provides playback capability for off-line, analysis.

The data supplied by the C-band, and/or X-band radar units may be supplemented by S-band radar data 23 supplied by National Weather Service radar units to provide a picture of the weather in a radius of 250 nautical miles surrounding the installation. The National Weather Service has a network of advanced S-Band Doppler radar stations in place at 138 sites in the United States, and is capable of delivering seventy-seven different data products to government meteorologists. The data products include; winds aloft, lightning activity and wind shear conditions such as microburst activity. Out of these seventy-seven products, eleven are allowed to be received by the public, which include four tilts or "slices" of the atmosphere in clear air mode and eleven slices of the atmosphere in storm mode.

The various slices of the atmosphere create a time delay in the acquisition of NEXRAD data. The NEXRAD radar first provides weather data for the lowest slice of the atmosphere. Then the angle of the radar relative to the ground is increased, and data is collected and transmitted for the next slice of the atmosphere. This process continues until the radar has collected data for each slice of the atmosphere. During this rotation, only one slice of the atmosphere is updated at a time, and thus the data for the remaining slices remain static until the radar returns to that part of the rotation. For example, if the data for the slice of the atmosphere lowest to the ground is collected and translated at 12:00, it will not be updated until about 12:05. This delay in data causes a problem in attempting to combine the data with real-time Doppler data.

The eleven data products from the National Weather Service are commercially available through private weather service companies, called "NIDS vendors" which act as intermediaries between the National Weather Service and the public. The acquisition of the eleven data products at a particular site requires a downlink microwave unit and file server.

In one embodiment, the present system can utilize the following National Weather Service data products to supplement the C-band and X-band radar data:

| Product # | Product ID | Product |
|---|---|---|
| 19 | R | Reflectivity (4 lowest tilts) |
|  | CR | Composite reflectivity |
| 36 | CR | Clear air mode |
| 38 | CR | Precipitation mode |
| 41 | ET | Echo tops |
| 57 | VIL | Vertical integrated liquid |
| 78 | OHP | Surface rainfall accumulation/ 1 hr running total |
| 79 | THP | Surface rainfall accumulation/ 3 hr total |
| 80 | STP | Surface rainfall accumulation/ Storm total |
| 81 | DPA | Hourly digital rainfall array product |
| 27 | V | Radial velocity (4 lowest tilts) |
| 48 | VWP | Velocity azimuth display (VAD) winds (time vs height) |
|  |  | Layer composite reflectivity |
| 65 | LRM | Low layer |
| 66 | LRM | Middle layer |
| 90 | LRM | High layer |
| 75 | FTM | Free text message (instrumentation messages) |

The time delay problem that exists in combining real-time Doppler and NEXRAD data exists to a certain extent with other types of weather data inputs. For example, lightening strike data is not input continuously but is recorded every second. Various other types of surface data inputs are available in a wide variety of time increments.

The desired weather data is transmitted via various communication lines to a microprocessor 15 that uses algorithims to translate this data into weather information that is useful to the viewer. Various processes for translating this information are well known to those of skill in the art, however, those of skill have not generally needed to compile this information in three dimensions. Those of skill in the art will recognize however, that the collected data may be separated and utilized according to height, as well as the familiar two dimensions that are commonly used. Microprocessor 15 used to compile the weather data and a computer 26 used to create the graphical display may actually exist in the same unit. In one embodiment, microprocessor 15 for this system is a dual Pentium7 processor platform.

In the third stage 30 (FIG. 1) of the process, the Doppler radar and NEXRAD data are combined to provide a substantially complete picture of current weather data. This is accomplished through a process of constantly adding data to the graphical representation, as it becomes available, and periodically updating the data to provide an accurate picture as of the time of the update.

The radar data may first be converted from the radial coordinates in which it is received, to Cartesian coordinates for easier 3D representation. Any other weather data that is received should also be converted to similar Cartesian coordinates to be filled into the area displayed. A unique feature of the present invention is the utilization of height data with respect to the weather data displayed. Previously, weather data has been displayed from a direct overhead view, so that only two dimension characteristics were necessary. The user could display the intensity and nature of a given storm cell, but only with respect to its geographic location, not with respect to the storm's height in the atmosphere. The present invention advantageously provides for the display of full volumetric information of the weather in a given geographic area.

Next, the data may be processed to provide a graphical representation of the current weather. The methods for converting real-time Doppler radar and NEXRAD data into graphical weather displays are well known by those of skill in the art of computerized weather-casting. The precipitation and velocity information are utilized to define the location and intensity of storm cells, as well as the existence of wind shear and other important weather factors. Although weather is not generally displayed with three-dimensional graphics, the methods for creating 3D displays once all of the data points have been determined are well known.

The fourth stage 40 (FIG. 1) of the process is the creation and update of a three-dimensional model of the current weather. FIG. 3 illustrates a graphical representation of the three-dimensional area to be illustrated once the weather data has been processed. A grid pattern 42 is illustrative of the geographic data stored in the computer memory, and provides the "x" and "y" axes of the Cartesian coordinates. A box 44 is illustrative of the atmosphere above the geographic area for which the weather data is collected, which provides the "z" axis. The Cartesian coordinates of the converted weather data correspond to coordinates within box 44.

The three-dimensional model of the weather data may be created by using data from the very recent past. If data has been collected and time tagged, then a full three-dimensional model of the weather within the geographic area may be built based upon the old data. Alternatively, the model may be developed without the use of saved data, for example, by building the three-dimensional model, as weather data becomes available. The model may be updated by defining a periodic update period, or "heartbeat," for the data system. In one embodiment a five-minute heartbeat is preferable for present day methods of collecting weather data. Other heartbeat periods may be suitable for collecting weather data. As weather data collection techniques become more advanced, the system heartbeat will likely be more rapid. Data is collected from all of the desired weather data sources during the five-minute period. The three-dimensional display is constantly updated with the available information. At the end of the five-minute period, all of the desired weather data sources will have reported data and the entire three-dimensional display can be completed based upon the full collection of data. The system then once again begins updating the display in preparation for the next heartbeat.

The periodic update period may best be explained with reference to the three-dimensional weather box shown in FIG. 3. Any weather passing through the box will be displayed. As weather data is collected it is immediately processed and then utilized to update the weather display. During the five-minute heartbeat period, the real-time Doppler radar data is constantly updated as the radar rotates. However, as stated above, the NEXRAD data is delivered in slices. As the data for the lowest slice of the atmosphere is collected, that portion of the display box is updated. As the next slice of atmosphere data is received, the new corresponding section of the display box is also updated. The lowest slice of atmosphere would remain primarily static, except for any changes that need to be made based upon the real-time Doppler radar data, or any other weather data input being utilized. In this way, the display box is constantly updated until the NEXRAD radar completes its cycle. At the end of the five-minute heartbeat period, the entire display box may be updated to match the compilation of weather data that has been collected during the proceeding five-minutes. Then the process will begin all over again.

Although only one weather box is shown in FIG. 3, it should be recognized that the present invention may utilize multiple boxes to build the three dimensional weather display. If the geographic area is large enough, then multiple NEXRAD radar sites and/or Doppler radar sites may be used to cover the entire area. In such case the user may find the system more versatile if it is broken down into several boxes, each of which is updated at its own heartbeat pace.

In the final stage 50 (FIG. 1), the three-dimensional graphical representation of the combined weather data is combined with the geographical data for display in "real-time." "Real-time display" for purposes of the present system is defined as display within approximately 6 minutes of acquiring meteorological data. The graphical representation is displayed relative to a selective "observation point" and dynamically controlled with respect to geographical and topographical data by a peripheral device, such as a mouse. The storm data is represented in full volume form, meaning that data representing the interior of the storm may also be displayed. This allows the user to rotate the storm cell and geographical data to view the storm from any angle. In addition the user may "slice" the storm to view its cross-section from any angle. The full volume graphical representation of the storm is well within the ordinary skill in the art, once the weather data has been collected and translated into Cartesian coordinates.

Those of ordinary skill in the art will appreciate that the time period from acquisition to display of meteorological date (i.e., real-time display) will vary depending on system and software implementation and advances in processor capability and speed. For example, as processor performance increases, the real-time display may be accomplished with a shorter period of time (e.g., less that 6 minutes).

As shown in FIG. 1, the process of collecting, processing and displaying the weather data is preferably continuous. That is, the three-dimensional model of the weather is constantly updated so that new data is utilized as soon as it is received.

Figure 4:
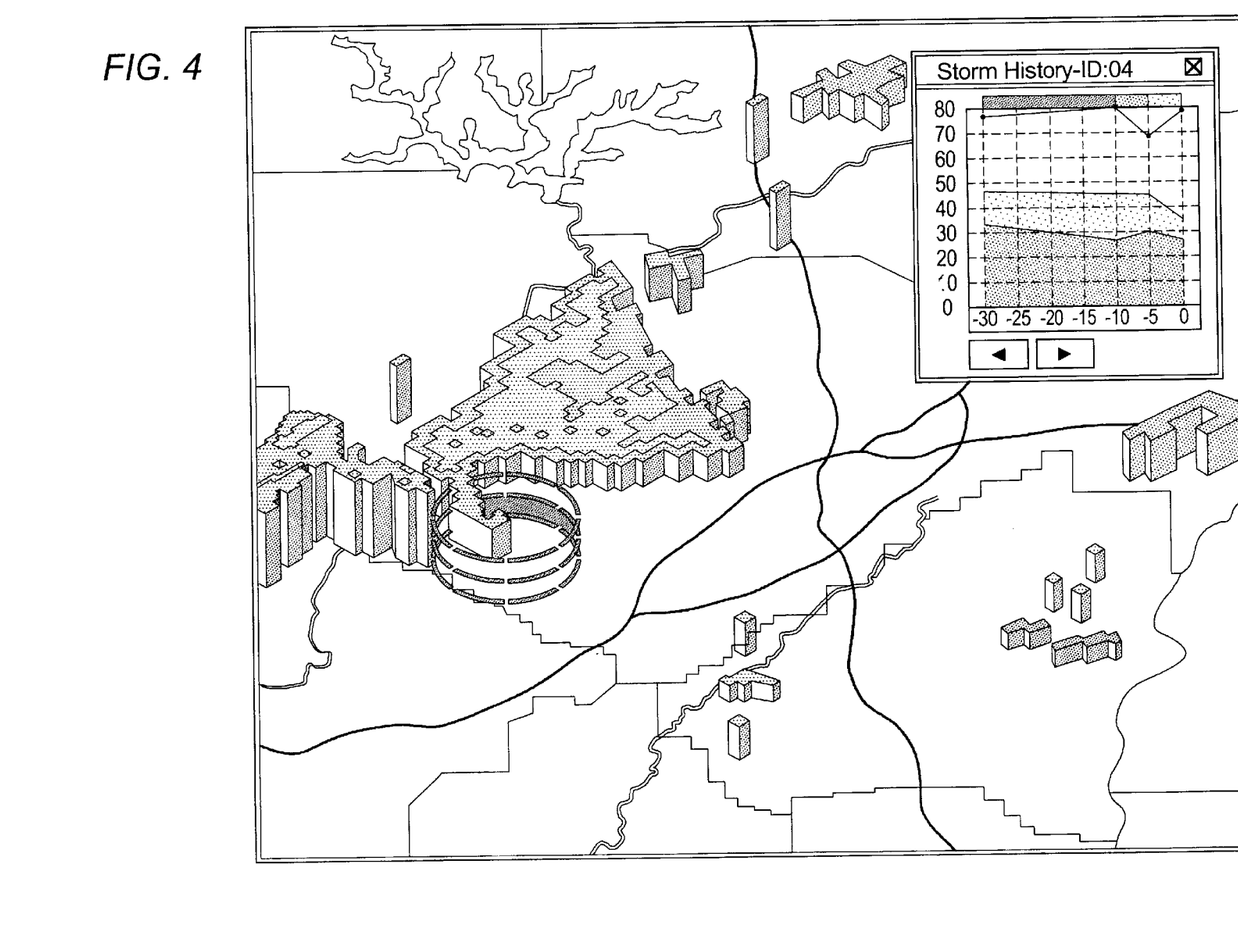
FIG. 4 is an example of a three-dimensional graphical display prepared utilizing the present invention.

In a one embodiment of the present invention, storm cells will be displayed by showing only their exterior, with various color schemes utilized to represent precipitation intensities. One display option for the user will be showing the storm from directly overhead. This will make the storm appear to be in the more familiar two-dimensional display that television viewers currently recognize. The user may then tilt the storm upon its "x" axis, to begin giving the storm height in a perspective view (FIG. 4). In this way, the television viewers will recognize the size of the storm cell, and still be able to associate geographic landmarks with the storm.

Should a thunderstorm enter the area, the radar system will be able to actually produce a 3-D "x-ray" of the storm itself. Using simple graphical techniques, the different storm structures can be visualized based upon radar reflectivity. All areas can be easily represented: the updraft vault, wall cloud, rain zones, lightening strikes, and dangerous wind shear locations. The Doppler radar would be able to detect the characteristic "hook" shape associated with tornadic rotation many minutes before the tornadoes touch the ground. The observer will be able to visualize the information in 3D.

Thus, broadcasters will be able to not only tell about storm activity, they will be able to show viewers -giving them a tour of the thunderstorm in real time. Suppose, for example, during a thunderstorm, circular motion begins to occur 1.000 feet above the ground over the corner of Smith Street and Elm Drive. The broadcaster would have the raw data and be able to zoom in on the structure, examine it—and then warn viewers.

During a hurricane; the viewers will be able to "see" the structure of the storm on their television screen, then perhaps travel down into the eye and through the wall of the hurricane. Intense updrafts, vortices and tornadic activity can be identified through visualization of Doppler images. For the first time, viewers will actually see what is going on in the air above them.

Rainfall intensities can also be determined and modeled using layering techniques, thus giving important information on potential flooding. This same technique can be ported to another real-time problem associated with urban life: reporting and visualization of traffic tie-ups.

A technical advantage of the present system includes providing exceptional data and graphics, far beyond what is now offered on television weathercasts.

It will be understood by those skilled in the meteorological data processing art that the system and corresponding methods of processing and displaying meteorological data of the present invention has numerous embodiments, and that the processed results may be disseminated to the consuming public or business community in a variety of ways, some of which will be described in the detailed description that follows. For example, the processed results may be provided to the consuming public by one or more web sites via a global computer network such as the internet, by radio, by facsimile, and/or by e-mail messages, to name a few. In addition, the processed results may be distributed to television sets via a television broadcast. Moreover, the results may be distributed by any number of communication mediums, such as, but not limited to, a land line telephone network, wireless telephone network, television cable network, a television broadcast network, or via radio broadcast. Accordingly, the following detailed description of the another embodiment of the invention is not to be taken in a limiting sense, but is made merely for the purpose of describing the general principles and operation of the invention as it is claimed. Unless otherwise expressly indicated in the text, the system and corresponding methods of processing meteorological data for the graphical display of more than one meteorological threat in a single image shall now be described as implemented by a television weathercaster.

An exemplary embodiment of the system for processing meteorological data to create a composite threat product in accordance with the present invention is shown schematically in FIG. 2. The weather processing system includes a computer 26 having memory and a processor 15. Although shown as separate units in FIG. 2, processor 15 and computer 26 may be a single unit.

In one embodiment, computer 22 can be located in the weather center of a local television station and may include a display device 27 having a display mechanism for graphically displaying meteorological data processed by processor 15. Computer 22 communicates with one or more sources of meteorological data such as, but not limited to, a source of Nexrad data 23, a source of other meteorological data 24 such as lightning data, and if available, a real-time local Doppler-radar source 21. Real-time Doppler radar source 21 can be owned or leased by the television station where the computer 22 resides. In such cases, radar return signals will be received by radar 21 and thereafter processed by radar processor 22 prior to being delivered to processor 15.

Technical advantages of the present invention are derived from the processing that occurs at processor 15. Processor 15 is programmed with instruction for processing meteorological data received from one or more of the meteorological data sources 22, 23, and/or 24. Software instructs processor 15 with respect to the way in which the received meteorological data is to be organized, manipulated, and thereafter combined so that it can be analyzed and processed using mathematical procedures that will be described in greater detail below. In one embodiment, processor 15 is instructed to derive three (3) types of threat products when processing the received meteorological data. The three types of threat products are then combined to produce a composite threat product that may be made immediately available for graphic display or dissemination through various other mechanisms. For the television broadcast industry, the output of the above-described processing may be automatically distributed from computer 26 along a communication path to remote receiving units having display devices 27 such as television sets where it may be graphically displayed.

Figure 5:
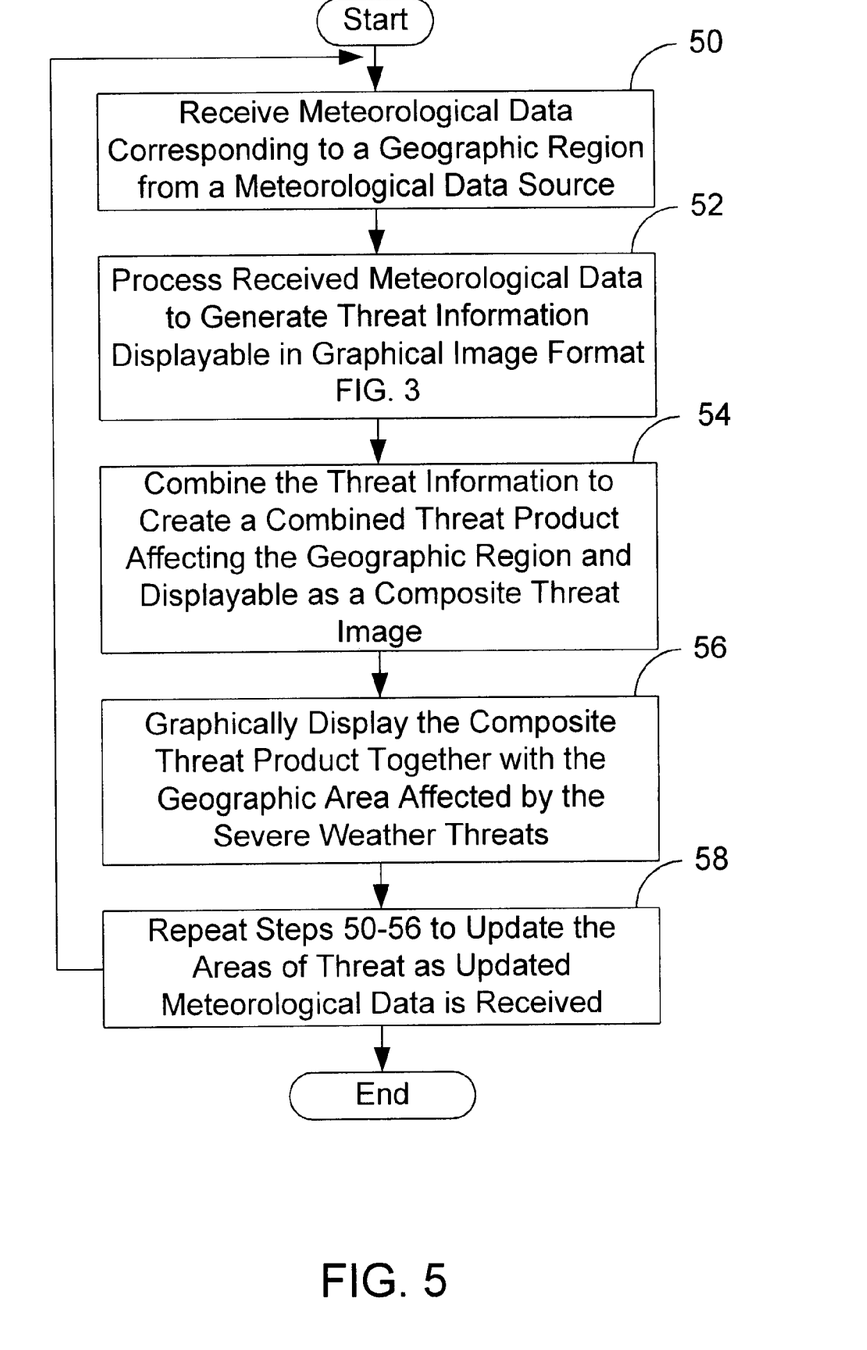
FIG. 5 is a flow chart illustrating a method of processing meteorological data in accordance with one embodiment of the present invention.

In operation, and with reference to FIG. 5, microprocessor 15 receives meteorological data corresponding to a geographic region from at least one meteorological data source, (step 50). This data may be real-time Doppler radar data received by a locally owned or leased radar 21, Nexrad radar data distributed by the NWS via a source of Nexrad data 23, another source of meteorological data 24, or some combination thereof. Generally speaking, the received meteorological data defines a detectable volume of a weather event affecting the geographic area of interest. Moreover, the received meteorological data is preferably stored in computer 26 memory.

The received meteorological data is processed to generate threat information that is displayable in graphical image format (step 52). This is further described with reference to FIG. 6. The threat information is then combined to create a combined threat field affecting the geographic region and is displayable as a composite image as (step 54). The composite threat product may be graphically displayed in image format together with the geographic area affected by the severe weather threats (step 56). Steps 50–56 may be repeated as updated meteorological data is received to update the areas of threat (step 58).

Figure 6:
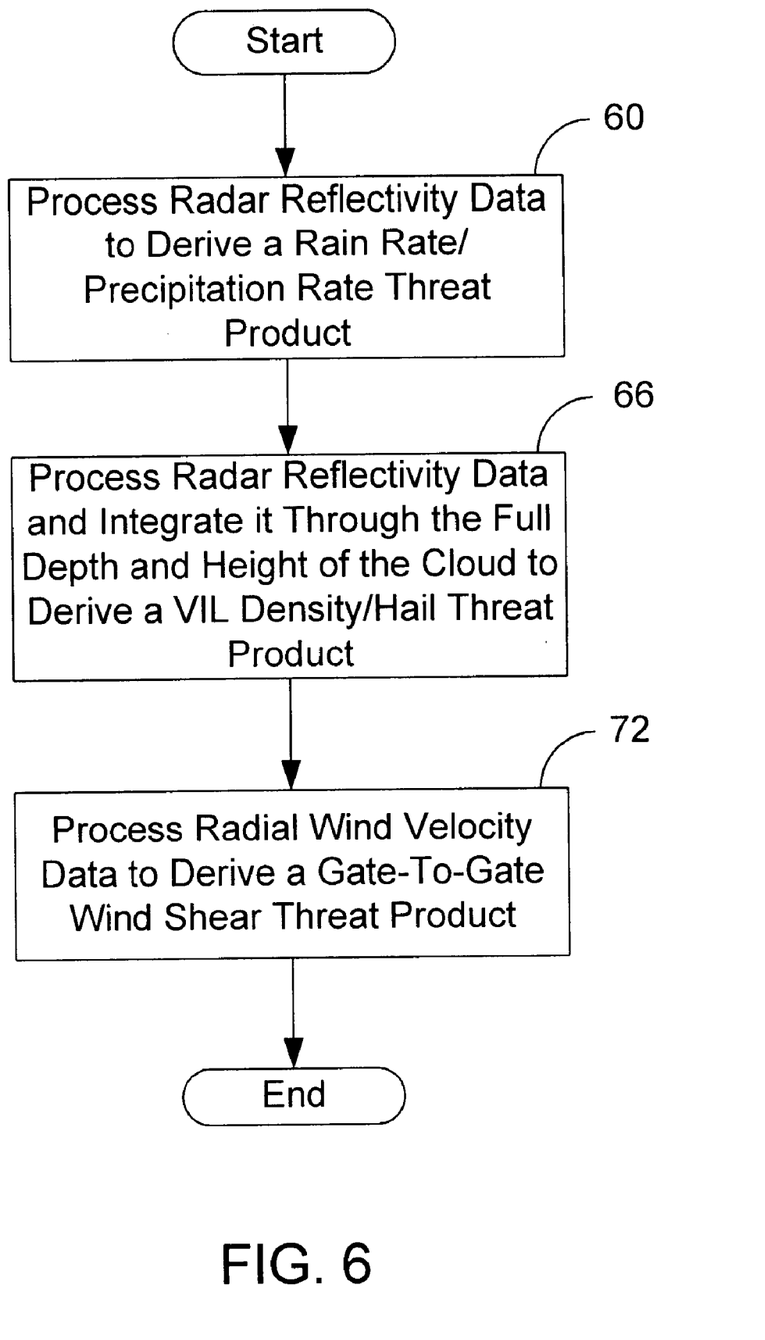
FIG. 6 is a flow chart illustrating one embodiment of a method of processing meteorological data to generate threat products as indicated at step 52 of FIG. 5.
Figure 7:
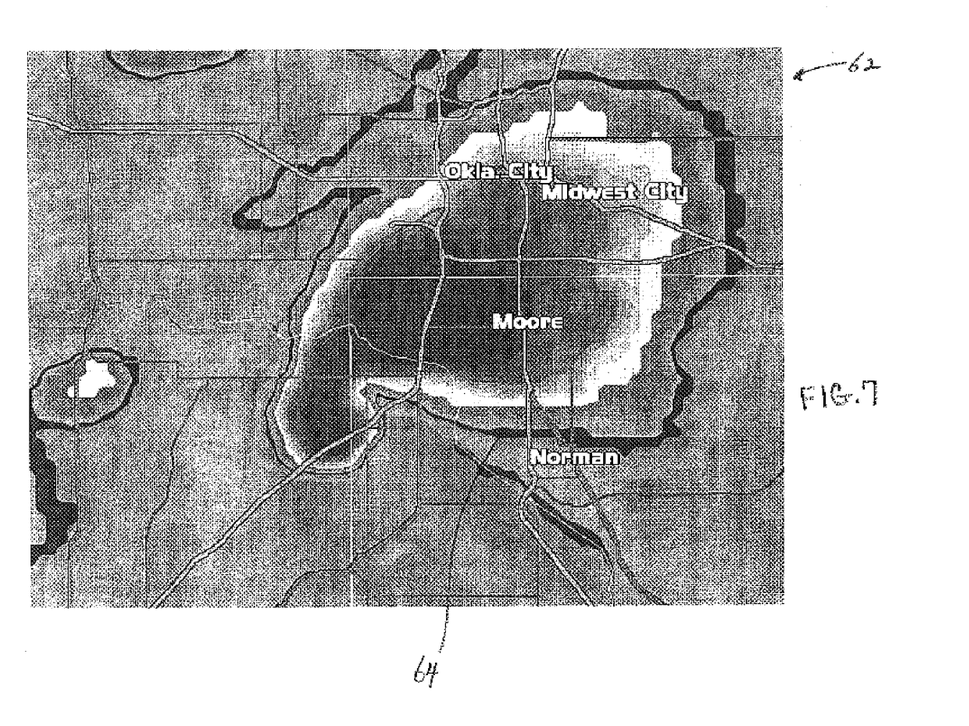
FIG. 7 is a rain rate/precipitation rate screen grab depicting a graphical image of an exemplary rain rate/precipitation rate threat product in accordance with one embodiment of the present invention.

The operation described in step 52 (FIG. 5) will now be described in greater detail with reference to FIG. 6. In one embodiment, the received meteorological data includes, but is not limited to, both radar reflectivity data and radial wind velocity data. This data is provided for each level or slice of the atmosphere ranging from radar tilt level 1 (that closest to the earth's surface) through the radar's echo top (the highest radar tilt level). The threat information displayable in graphical image format is generated by processing the radar reflectivity data to derive a radar rain rate/precipitation threat product (step 60), the generation of which is conventionally known in the art. An exemplary radar rain rate/precipitation rate screen grab 62 depicting an exemplary rain rate/precipitation rate threat product 64 is depicted in FIG. 7.

Figure 8:
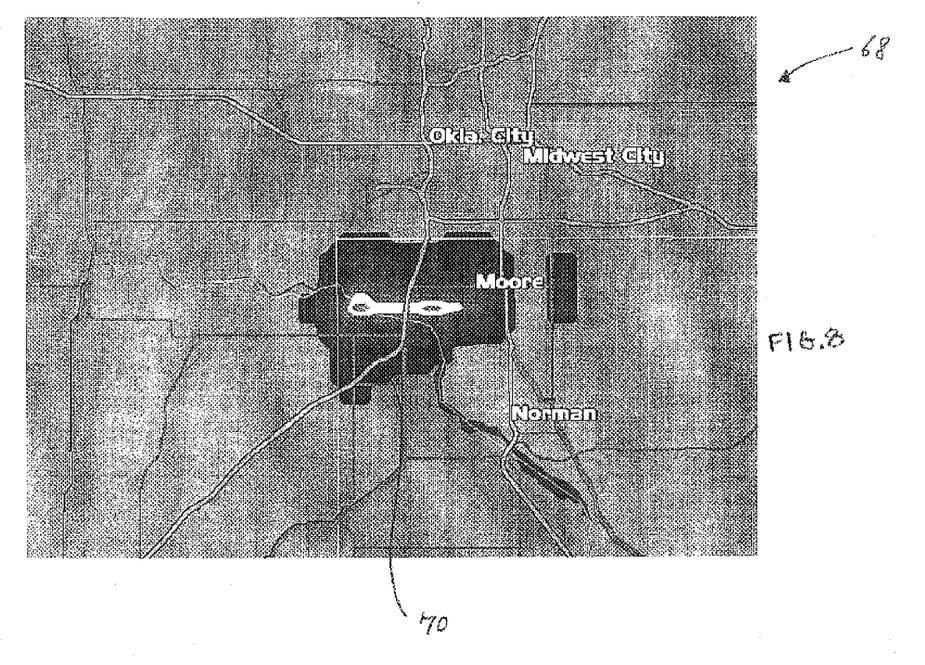
FIG. 8 is a VIL density screen grab illustrating an exemplary graphical image of a VIL density/hail threat product in accordance with one embodiment of the present invention.

The radar reflectivity data is processed to derive a Vertical Integrated Liquid (VIL) density/hail threat product (step 66). An exemplary VIL density hail threat products 70 is shown in a VIL Density screen grab 68 in FIG. 8. More particularly, VIL Density/hail threat product 70 is shown substantially centrally positioned within VIL Density screen grab 68. To derive VIL Density, the radar reflectivity data is integrated through the full depth of the cloud or storm knowing the height of the cloud, or what is known in the art as the cloud's echo top, where the VIL is the radar-estimated integrated liquid water in the cloud, and the density is the concentration of that liquid water per cubic volume. Thus, the VIL density/hail threat product is derived by taking the VIL in the cloud and dividing that value by the radar-estimated height of the cloud. Generally speaking, a relatively high VIL Density value is highly correlated with severe weather through factors such as hail, hail size, strong surface winds, and lightning.

Figure 9:
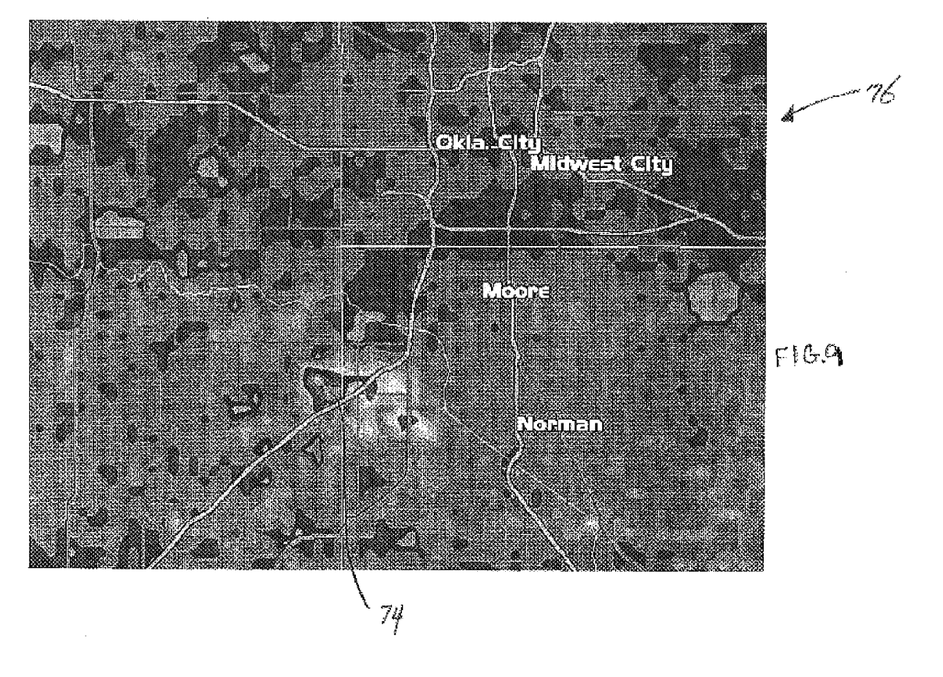
FIG. 9 is a wind sheer screen grab illustrating an exemplary graphical image of a gate-to-gate wind sheer threat product in accordance with one embodiment of the present invention.

Radial wind velocity data received from the meteorological data source is processed to derive a gate-to-gate wind shear threat product (step 72). An exemplary gate-to-gate wind shear threat product 74 is depicted in the wind shear screen grab 76 in FIG. 9. Like the other threat products, gate-to-gate wind shear product 74 may be graphically displayed in either two dimensional or three dimensional format and overlaid or otherwise associated with the geographic area that it is affecting. Although the processing steps described above have been shown and described in a particular order, it will be appreciated by those skilled in the art that the processing steps necessary to derive the rain rate/precipitation rate threat product 64, VIL density/hail threat product 70, and gate-to-gate wind shear threat product 74 may be performed in any sequence without departing from the spirit and scope of the present invention.

Referring again to FIG. 5, once the radar reflectivity data and radial wind velocity data are processed to derive the above-mentioned threat products, the threat products are combined to create a combined or composite threat product that represents the primary meteorological threats affecting the geographic region of interest. Like the aforementioned individual threat products, the combined threat product is displayable as a composite threat image 78 as indicated in the composite screen grab 80 in FIG. 10.

Figure 10:
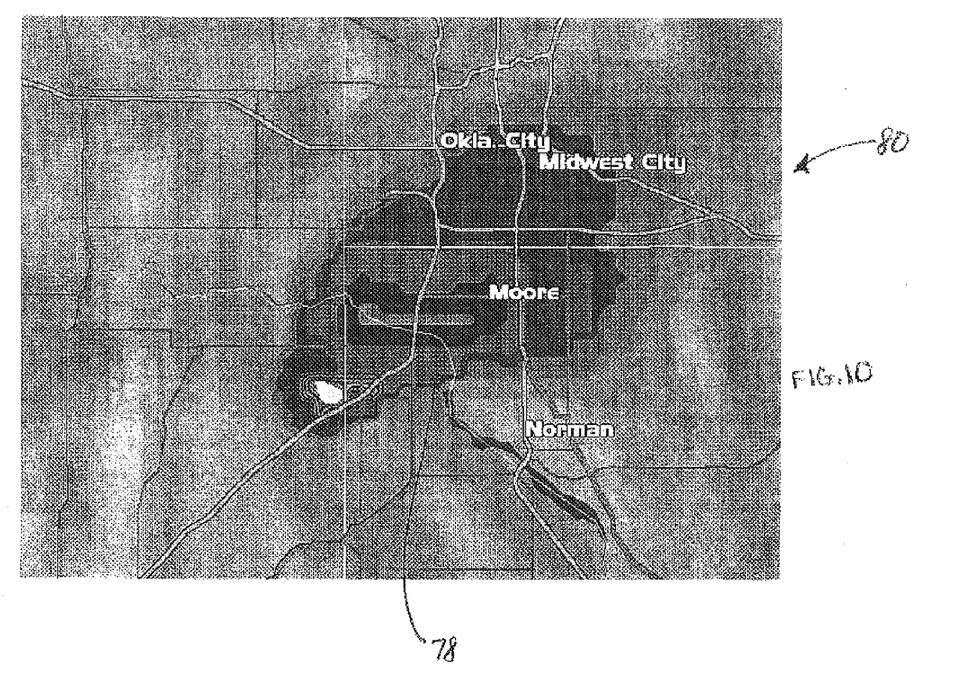
FIG. 10 is a composite screen grab illustrating an exemplary graphical image of a composite threat product in accordance with one embodiment of the present invention.

As illustrated in the composite screen grab 80 depicted in FIG. 10, composite threat image 78 corresponding to the composite threat product may be graphical displayed on an optional display device 27 such as a television set via television broadcast.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A method of processing weather data comprising:
   receiving a meteorological data corresponding to a geographical region from at least one meteorological data source, the meteorological data comprising a radar reflectivity data and a radial wind velocity data;
   processing the radar reflectivity data to derive a rain rate/precipitation threat product;
   processing the radar reflectivity data to derive a Vertical Integrated Liquid density/hail threat product;
   processing the radial wind velocity data to derive a gate-to-gate wind shear threat product; and
   combining the rain rate/precipitation threat product, Vertical Integrated Liquid density/hail threat product, and gate-to-gate wind shear threat product to create a composite threat product.

2. The method of claim 1 further comprising displaying the composite threat product as an image together with the geographic region affected by the composite threat product on a display device.

3. The method of claim 1 wherein the composite threat product is displayable in graphical image format.

4. The method of claim 1 wherein the combining the rain rate/precipitation threat product, the Vertical Integrated Liquid density/hail threat product, and the gate-to-gate wind shear threat product comprises superimposing the rain rate/precipitation threat product, the Vertical Integrated Liquid density/hail threat product, and the gate-to-gate wind shear threat product over a graphical image representing at least a portion of the geographical region.

5. The method of processing meteorological data comprising:

creating a composite threat product from a meteorological data received from at least one meteorological data source, the meteorological data comprising a radar reflectivity data and a radial wind velocity data; and graphically displaying the composite threat product together with a geographic data indicative of the geographic region affected by the composite threat product on a display device.

6. The method of claim 5, wherein the creating the composite threat product comprises processing the meteorological data to derive a rain rate/precipitation threat product, a Vertical Integrated Liquid density threat product, and a gate-to-gate wind shear threat product, and combining the rain rate/precipitation threat product, the Vertical Integrated Liquid density threat product, and the gate-to-gate wind shear threat product.

7. A system for processing meteorological data comprising:

memory for storing a meteorological data corresponding to a geographical region, the meteorological data received from at least one meteorological data source, the meteorological data comprising a radar reflectivity data and a radial wind velocity data; and a processor communicating with said memory to create a plurality of distinct threat products from the received meteorological data, the processor instructed to combine the plurality of distinct threat products to produce a composite threat product capable of being graphically displayed.

8. The system of claim 7 further comprising a display device operable to communicate with the processor to display a graphical image of the composite threat product together with a graphical representation of the geographical region affected by the composite threat product.

9. The system of claim 7 wherein the plurality of distinct threat products comprises a rain rate threat product, a Vertical Integrated Liquid density threat product, and a gate-to-gate wind shear threat product.

10. A method of processing meteorological data comprising:

receiving meteorological data defining a detectable volume of a weather event affecting a geographic region;

processing the received meteorological data to generate a plurality of threat products affecting the geographic region, each of the plurality of threat products being distinct from one another; and combining the plurality of distinct threat products affecting the geographic region to create a composite threat product.

11. The method of claim 10, wherein the meteorological data comprises a radar reflectivity data and a radial wind velocity data.

12. The method of claim 11, wherein the processing the received meteorological data comprises deriving a rain rate threat product from the radar reflectivity data, deriving a Vertical Integrated Liquid density threat product from the radar reflectivity data, and deriving a gate-to-gate wind shear threat product from the radial wind velocity data.

13. The method of claim 10 further comprising displaying a graphical image indicative of the composite threat product together with a graphical image indicative of the geographic region affected by the composite threat product.

14. The method of claim 10 further comprising superimposing a graphical image of the composite threat product over a graphical image of the geographic region affected by the composite threat product.

15. A system for processing meteorological data comprising:

means for receiving meteorological data indicative of a meteorological event affecting a geographic region, the meteorological data comprising a radar reflectivity data and a radial wind velocity data;

means for storing the received meteorological data;

means for processing the received meteorological data to create a plurality of threat products, the plurality of threat products comprising a rain rate threat product, a Vertical Integrated Liquid density threat product, and a gate-to-gate wind shear threat product; and means for combining the plurality of threat products to create a composite threat product.

16. The system of claim 15 further comprising a means for associating the composite threat product with a graphical image of the geographic region affected by the meteorological event, and graphically displaying the composite threat product with the graphical image of the geographic region on a display device.

* * * * *